US009819507B1

(12) United States Patent
Govindassamy

(10) Patent No.: US 9,819,507 B1
(45) Date of Patent: Nov. 14, 2017

(54) MOBILE BROADBAND MANAGEMENT OVER PLURALITY OF MEDIA

(71) Applicant: MBIT WIRELESS, INC., Newport Beach, CA (US)

(72) Inventor: Sivakumar Govindassamy, Irvine, CA (US)

(73) Assignee: MBIT WIRELESS, INC., Irvine, CA (US)

( * ) Notice: Subject to any disclaimer, the term of this patent is extended or adjusted under 35 U.S.C. 154(b) by 134 days.

(21) Appl. No.: 14/989,137

(22) Filed: Jan. 6, 2016

Related U.S. Application Data

(60) Provisional application No. 62/160,445, filed on May 12, 2015.

(51) Int. Cl.
*H04W 4/00* (2009.01)
*H04L 12/28* (2006.01)
*H04L 12/46* (2006.01)
*H04L 12/741* (2013.01)
*H04W 84/12* (2009.01)

(52) U.S. Cl.
CPC ...... *H04L 12/2801* (2013.01); *H04L 12/4675* (2013.01); *H04L 45/74* (2013.01); *H04W 84/12* (2013.01)

(58) Field of Classification Search
None
See application file for complete search history.

(56) References Cited

U.S. PATENT DOCUMENTS

| | | | |
|---|---|---|---|
| 6,747,977 B1 * | 6/2004 | Smith | H04L 12/5601 370/395.64 |
| 6,987,756 B1 * | 1/2006 | Ravindranath | H04L 29/06 370/352 |
| 8,751,670 B2 | 6/2014 | Xu | |
| 9,635,711 B1 * | 4/2017 | Govindassamy | H04W 92/14 |
| 2003/0074554 A1 * | 4/2003 | Roach | H04L 63/04 713/153 |
| 2006/0080402 A1 * | 4/2006 | Han | H04L 69/16 709/217 |
| 2007/0140195 A1 | 6/2007 | Kaftan | |
| 2009/0249469 A1 * | 10/2009 | Ishikawa | H04L 47/10 726/13 |
| 2012/0023243 A1 | 1/2012 | Xu | |

(Continued)

*Primary Examiner* — Farah Faroul
(74) *Attorney, Agent, or Firm* — Lerner, David, Littenberg, Krumholz & Mentlik, LLP

(57) ABSTRACT

As the variety of client devices has increased and the demand for mobile broadband internet access has increased, a device known as a mobile Hotspot is becoming common. The mobile Hotspot device includes both a modem for mobile broadband access and a Hotspot Access Point to distribute the internet to local devices which may have only WLAN capability. When accessing the internet over a mobile broadband network through the mobile Hotspot, the client device may not have visibility on the status of the mobile network, MB modem status and the Universal Subscriber Identity Module (USIM). A method and apparatus are disclosed that enable the client device to connect the mobile Hotpot as a virtual mobile broadband device over the WLAN. This may be used to present more detailed information to the user about the connection and that may lead to improved user experience.

20 Claims, 19 Drawing Sheets

(56) References Cited

U.S. PATENT DOCUMENTS

| | | | |
|---|---|---|---|
| 2012/0131215 A1* | 5/2012 | Balay | H04L 63/102 709/228 |
| 2013/0084836 A1 | 4/2013 | Guenkova-Luy et al. | |
| 2014/0207991 A1* | 7/2014 | Kaushik | G06F 13/4269 710/308 |
| 2015/0212833 A1 | 7/2015 | Wang et al. | |
| 2016/0026460 A1* | 1/2016 | Zhang | H04L 67/34 717/170 |
| 2016/0085577 A1* | 3/2016 | Gray | G06F 9/45558 718/1 |
| 2016/0124886 A1* | 5/2016 | Tian | G06F 9/4406 710/301 |
| 2016/0227471 A1 | 8/2016 | De Foy et al. | |
| 2016/0301573 A1* | 10/2016 | Kliger | H04L 41/0896 |

\* cited by examiner

MOBILE BROADBAND MANAGEMENT OVER PLURALITY OF MEDIA

CROSS-REFERENCE TO RELATED APPLICATION

The present application claims the benefit of the filing date of U.S. Provisional Patent Application No. 62/160,445 filed May 12, 2015, the disclosure of which is hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data transfer rates it is often referred to as broadband internet service. Broadband internet service is generally understood to be a service that is always on and offers data transfer rates on the order of mega-bits per second for both download and upload.

A client device as defined in the present disclosure is a device that may use the internet from one or more of the sources from which internet service is available. Such client devices may include conventional client devices such as a smartphone, a tablet, a feature-phone, a laptop or desktop personal computer, etc. Other client devices may include devices that are embedded within devices that perform other functions. For example, an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc., may include a client device. These types of devices may be collectively referred herein as machine type client devices.

These diverse types of client devices may access the internet service directly through one of the sources of primary internet access as mentioned earlier. Alternatively, a client device may access the internet through a local network, which performs distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing the internet over a WLAN network that is connected to a traditional wire-line internet service such as a DSL or a cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL/cable modem through any of the standardized interfaces such as Universal Serial Bus (USB), Ethernet, or proprietary interfaces. In some cases, the DSL/cable modem and the Hotspot AP may be part of a single physical device. In such cases, the interface between the DSL/cable modem and AP may use Secure Digital Input Output (SDIO) or another suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be an Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that may be carried around with or without a battery, integrated into an accessory device such as a tablet, a standalone device that may be powered by a power wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is near a Hotspot AP, it may use internet service from the Hotspot as illustrated in FIG. 1. In another smartphone example, the mobile broadband modem, the WLAN AP and the Application Processor may be an integrated device as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a client device that may have only a WLAN access. In another smartphone mobile hotspot example, the mobile broadband modem, the WLAN AP and the Application Processor may be integrated into a single IC as shown in FIG. 7.

A mobile Hotspot may be part of an accessory or peripheral device for a client device such as a tablet. Other examples of such accessory or peripheral device may include a standalone mouse, a battery pack, a cover, a stand or any other machine type client device. FIG. 8 illustrates an example scenario where a cover or a stand for a tablet includes mobile Hotspot connectivity. The mobile hotspot may be connected with the tablet client device using General Purpose Input/Output (GPIO) lines, Inter-Integrated Circuit (I2C) bus, Universal Asynchronous Receiver/Transmitter (UART), USB, SDIO, Bluetooth or any other standardized or proprietary interfaces. The data transfer and some of the control, such as power on/off, configuration, and notifications between client device and the mobile Hotspot may occur over the WLAN connection, or over any of the other available interface connection.

A client device may use a mobile Hotspot when internet access is required. A mobile Hotspot may be provided by a smartphone, by a single function mobile Hotspot device, or by an accessory such as a tablet cover that may include a mobile broadband modem and backup battery. A client device must continually search and choose the best Hotspot available.

FIG. 9 shows a block diagram 900 of example software architecture of a conventional client device for interfacing with a WLAN and with a Network Interface Card (NIC) such as an Ethernet when using a Windows operating system (OS). As shown in FIG. 9, the WLAN hardware (HW) block 902 is controlled by the WLAN Device Driver 904. The WLAN Device Driver block 904 interfaces with the WLAN Application (APPLN) 906.

Similar to the WLAN interface, the Network Interface Card (NIC) Device Driver block 908 interfaces with the NIC HW that may be present. The NIC Device Driver block 908 interfaces with the MiniPort Driver (MPD) block 910, which in turn interfaces with the Network Driver Interface Specification (NDIS), block 912. The NDIS block 912 interfaces with the NDIS User mode Input/Output (UIO) block 914. The NDIS UIO block 914 provides a unified interface to the WWAN Service block 916 independent of the underlying HW. The WWAN Service block 916 interfaces with the MB Application Programming Interface (API) block 918 which provides interface to all the applications such as MB application 920 which may use the MB internet service. The processing blocks 904, 908, 910, 912, and 914 operate in the Kernel mode of the OS whereas the other processing blocks operate in User mode of the OS. The MB application 920 uses the primitives defined by the MB Interface Model (MBIM) to communicate with the MB API block 918.

When a client device such as a tablet receives service from a mobile Hotspot, the quality of service may vary due to a number of factors such as the signal quality of wireless communication network may fade because the user may be mobile, the congestion in the communication network, the interruptions in data transfer during handovers, etc. Furthermore, the network access capability including roaming capability of the mobile Hotspot may be controlled by the contents of the Universal Subscriber Identity Module (USIM) that runs in the Universal Integrated Circuit Card (UICC). The UICC may be attached to the mobile broadband device such as the mobile Hotspot. The client device may not have direct access to it. Conventional client devices do not have the capability to access the wireless communication network status and the USIM/UICC status when accessing a MB network through a mobile Hotspot.

SUMMARY

A method and apparatus are disclosed that enable a client device to project the mobile Hotspot device as a virtual MB modem for control path through the mobile Hotspot WLAN connection. The disclosed method and apparatus are applicable for projecting the mobile Hotspot device as a virtual MB modem in a client device over interfaces such as Bluetooth, SDIO, USB, I2C, GPIO or any other communication interface. This method enables the client device to access the MB network status, MB modem status and the USIM/UICC status when getting a MB service through a mobile Hotspot. The method also enables a client device to use all the features of having MB modem virtually connected to it even though it is connected to the MB modem through the mobile Hotspot.

In accordance with an aspect of the present invention, a method may be for projecting a device configured for mobile broadband (MB) access and local internet distribution as a virtual MB modem for control path, wherein the projecting of the device as the virtual MB modem is through a first interface of a client device. The method may include: controlling, by a processing device, creating a path for routing a MB Interface Model (MBIM) control flow related packet between a first device driver of the first interface of the client device and a MB application of the client device, in which the path includes a second device driver of a second interface of the client device for communicatively coupling the first device driver to the MB application, wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler; controlling, by the processing device, encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and controlling, by the processing device, when a MBIM control path packet is determined to be encoded as the VCP packet, routing the MBIM control path packet encoded from the Encoder/Decoder to the WWAN Interface Handler, wherein the WWAN interface handler is for communicating with a Virtual Target Pass through Driver (VTPTD) using a device Input Output Control (IOCTL) protocol, wherein a Virtual Target Device Interface (VTDI) is for communicating with the VTPTD and a Virtual Network Interface Card (VNIC) Device Driver, in which the VNIC device driver is included in the second device driver, and wherein the path includes the VTPTD, the VTDI and the VNIC Device Driver.

In one alternative, the method may include controlling, by the processing device, when the MBIM control path packet is determined to be encoded as the VCP packet, routing the MBIM control path packet encoded from the WWAN Interface Handler, through the VTPTD, the VTDI and the VNIC Device Driver, to the MB application.

In one alternative, the method may include controlling, by the processing device, determining by the Client Data Encoder/Decoder whether the MBIM control path packet or a non-MBIM control path packet is encoded as the VCP packet, when the MBIM control path packet is determined to be is encoded as the VCP packet, routing the MBIM control path packet to the MB application, and when the non-MBIM control path packet is determined to be is encoded as the VCP packet, routing the non-MBIM control path packet to an Auxiliary MB Application.

In one alternative, the MB Application and the Auxiliary MB Application may be integrated into an enhanced MB Application.

In one alternative, the method may include controlling, by the processing device, routing the MBIM or non-MBIM control path packet from the WWAN Interface Handler, through the VTPTD, the VTDI and the VNIC Device Driver, to the enhanced MB application.

In one alternative, the MB Service may include a Packet Router for communicating with the Encoder/Decoder, the WWAN interface handler and a Client Application Interface, the Client Application Interface may be for communicating with an Auxiliary MB application, and the path may include the Packet Router, and the method may further include: controlling, by the processing device, extracting by the packet router from an MB packet from the VCP packet, when an MBIM Command ID (CID) of the extracted MB packet is determined to be supported by a native MB application, routing of the MB packet to the WWAN Interface Handler, and when the MBIM Command ID (CID) of the extracted MB packet is determined not to be supported by the native MB application, routing of the MB packet to the Auxiliary MB application via the Client Application Interface, in which the AUX MB application is configured to enable user interface configuration and provide notification of an Auxiliary MBIM indication.

In one alternative, the MB Service may include a Packet Router for communicating with the Encoder/Decoder and the WWAN interface handler, and the method may further include: controlling, by the processing device, when the MB application sends a second MBIM control request, routing the second MBIM control request to the WWAN interface handler through the VNIC device driver, the VTDI and the VTPTD, and from the WWAN interface handler through the Packet Router to the Encoder/Decoder, encoding by the Encoder/Decoder the second MBIM control request as a second VCP packet, and routing of the second VCP packet through the Client Socket Interface to the first device driver.

In one alternative, the method may include: controlling, by the processing device, when the MBIM control path packet is determined to be encoded as the VCP packet, routing the MBIM control path packet encoded from the Encoder/Decoder directly, without an intermediary, to the WWAN Interface Handler.

In one alternative, the first interface may be a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

In one alternative, the first interface may be a Universal Serial Bus (USB) interface, and the first interface may be communicatively coupled to the MB service through a Customer Premises Equipment within the client device.

In one alternative, the Interface Header part may include a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use, and the payload may have a maximum length of 65535 bytes.

In accordance with an aspect of the present invention, apparatus may be configured for projecting a device configured for mobile broadband (MB) access and local internet distribution as a virtual MB modem for control path, wherein the projecting of the device as the virtual MB modem is through a first interface of a client device. The apparatus may include circuitry configured to control: creating a path for routing a MB Interface Model (MBIM) control flow related packet between a first device driver of the first interface of the client device and a MB application of the client device, in which the path includes a second device driver of a second interface of the client device for communicatively coupling the first device driver to the MB application, wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler; encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and when a MBIM control path packet is determined to be encoded as the VCP packet, routing the MBIM control path packet encoded from the Encoder/Decoder to the WWAN Interface Handler, wherein the WWAN interface handler is for communicating with a Virtual Target Pass through Driver (VTPTD) using a device Input Output Control (IOCTL) protocol, wherein a Virtual Target Device Interface (VTDI) is for communicating with the VTPTD and a Virtual Network Interface Card (VNIC) Device Driver, in which the VNIC device driver is included in the second device driver, and wherein the path includes the VTPTD, the VTDI and the VNIC Device Driver.

In one alternative of the apparatus, the circuitry may be configured to control, when the MBIM control path packet is determined to be encoded as the VCP packet, routing the MBIM control path packet encoded from the WWAN Interface Handler, through the VTPTD, the VTDI and the VNIC Device Driver, to the MB application.

In one alternative of the apparatus, the circuitry may be configured to control: determining by the Client Data Encoder/Decoder whether the MBIM control path packet or a non-MBIM control path packet is encoded as the VCP packet, when the MBIM control path packet is determined to be is encoded as the VCP packet, routing the MBIM control path packet to the MB application, and when the non-MBIM control path packet is determined to be is encoded as the VCP packet, routing the non-MBIM control path packet to an Auxiliary MB Application.

In one alternative of the apparatus, the MB Application and the Auxiliary MB Application may be integrated into an enhanced MB Application.

In one alternative of the apparatus, the MB Service may include a Packet Router for communicating with the Encoder/Decoder, the WWAN interface handler and a Client Application Interface, the Client Application Interface may be for communicating with an Auxiliary MB application, and the path may include the Packet Router, and the circuitry may be configured to control: extracting by the packet router from an MB packet from the VCP packet, when an MBIM Command ID (CID) of the extracted MB packet is determined to be supported by a native MB application, routing of the MB packet to the WWAN Interface Handler, and when the MBIM Command ID (CID) of the extracted MB packet is determined not to be supported by the native MB application, routing of the MB packet to the Auxiliary MB application via the Client Application Interface, in which the AUX MB application is configured to enable user interface configuration and provide notification of an Auxiliary MBIM indication.

In one alternative of the apparatus, the MB Service may include a Packet Router for communicating with the Encoder/Decoder and the WWAN interface handler, and the circuitry may be configured to control: when the MB application sends a second MBIM control request, routing the second MBIM control request to the WWAN interface handler through the VNIC device driver, the VTDI and the VTPTD, and from the WWAN interface handler through the Packet Router to the Encoder/Decoder, encoding by the Encoder/Decoder the second MBIM control request as a second VCP packet, and routing of the second VCP packet through the Client Socket Interface to the first device driver.

In one alternative of the apparatus, the circuitry may be configured to control, when the MBIM control path packet is determined to be encoded as the VCP packet, routing the MBIM control path packet encoded from the Encoder/Decoder directly, without an intermediary, to the WWAN Interface Handler.

In accordance with an aspect of the present invention, a wireless communication device may include a receiver to receive a wireless communication; and a processing device configured for projecting a device configured for mobile broadband (MB) access and local internet distribution as a virtual MB modem for control path, wherein the projecting of the device as the virtual MB modem is through a first interface of the wireless communication device, wherein the processing device is configured to control: creating a path for routing a MB Interface Model (MBIM) control flow related packet between a first device driver of the first interface of the wireless communication device and a MB application of the wireless communication device, in which the path includes a second device driver of a second interface of the wireless communication device for communicatively coupling the first device driver to the MB application, wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler; encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and when a MBIM control path packet is determined to be encoded as the VCP packet, routing the MBIM control path packet encoded from the Encoder/Decoder to the WWAN Interface Handler, wherein the WWAN interface handler is for communicating with a Virtual Target Pass through Driver (VTPTD) using a device Input Output Control (IOCTL) protocol, wherein a Virtual Target Device Interface (VTDI) is for communicating with the VTPTD and a Virtual Network Interface Card (VNIC) Device Driver, in which the VNIC device driver is included in the second device driver, and wherein the path includes the VTPTD, the VTDI and the VNIC Device Driver.

In one alternative of the wireless communication device, the processing device may be configured to control: determining by the Client Data Encoder/Decoder whether the MBIM control path packet or a non-MBIM control path packet is encoded as the VCP packet, when the MBIM control path packet is determined to be is encoded as the VCP packet, routing the MBIM control path packet to the MB application, and when the non-MBIM control path packet is determined to be is encoded as the VCP packet, routing the non-MBIM control path packet to an Auxiliary MB Application.

DETAILED DESCRIPTION

Figure 1:
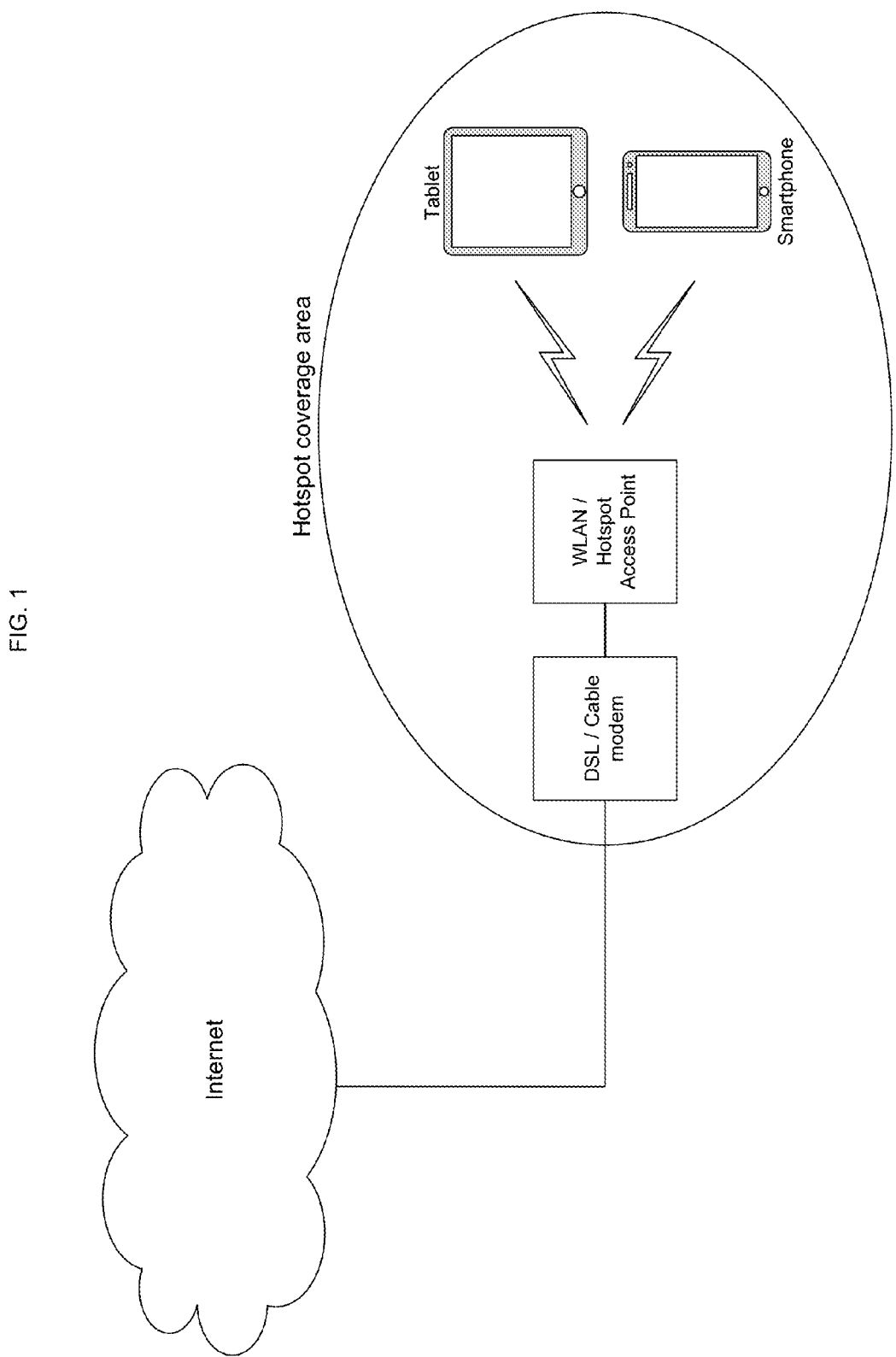
FIG. 1 illustrates an example scenario of internet access using WLAN network over a traditional wire-line internet service.
Figure 2:
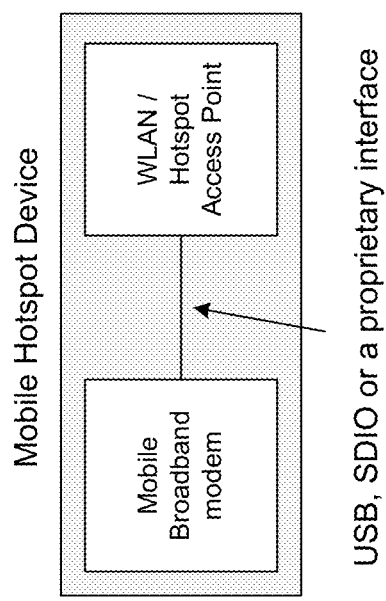
FIG. 2 illustrates a high-level block diagram of an example mobile Hotspot device.
Figure 3:
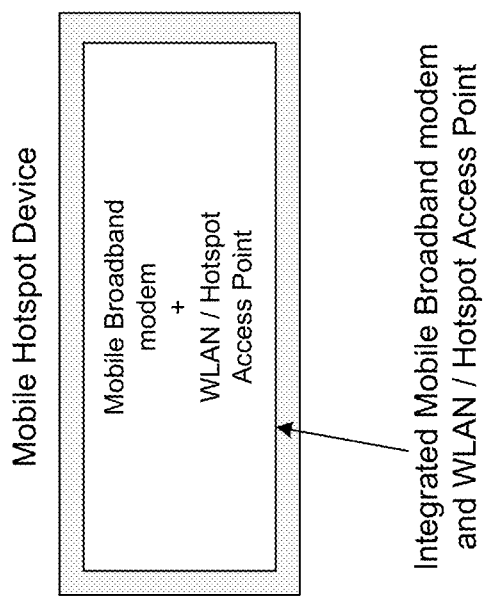
FIG. 3 illustrates a high-level block diagram of an example mobile Hotspot device with an integrated mobile broadband modem and WLAN Access Point.
Figure 4:
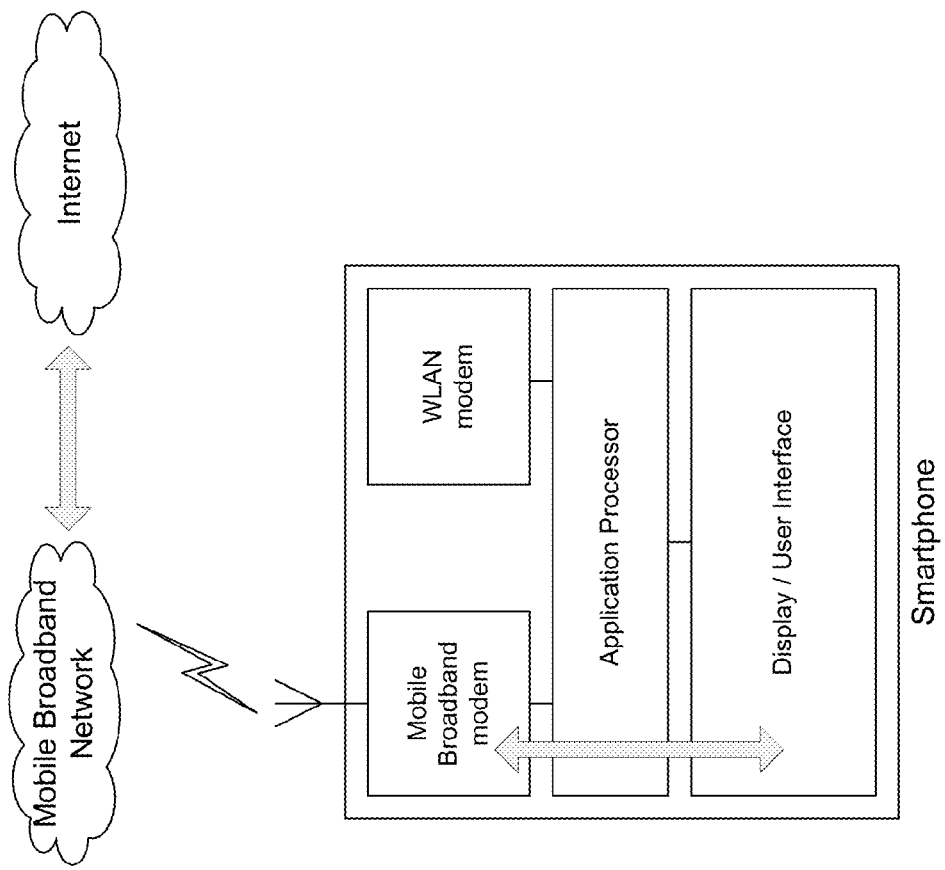
FIG. 4 illustrates a use case of internet access over a mobile broadband network by a smartphone client device.
Figure 5:
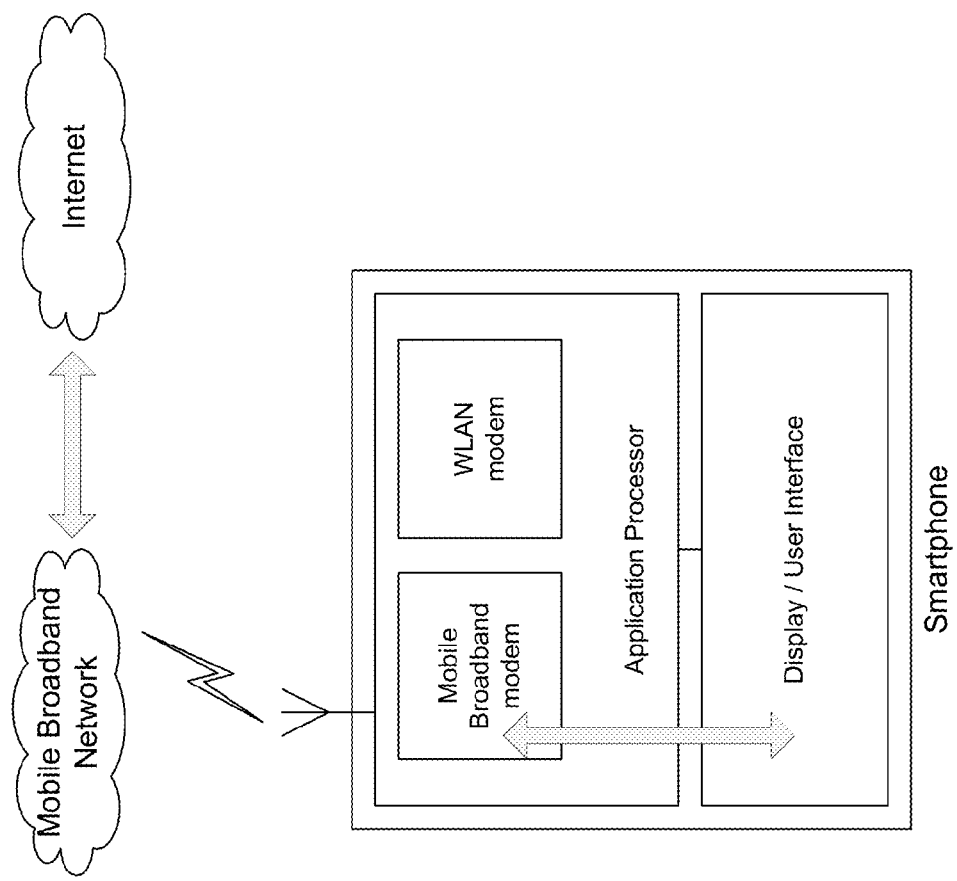
FIG. 5 illustrates a use case of internet access over a mobile broadband network by a smartphone client device with an integrated mobile broadband modem, WLAN Access Point, and Application Processor.
Figure 6:
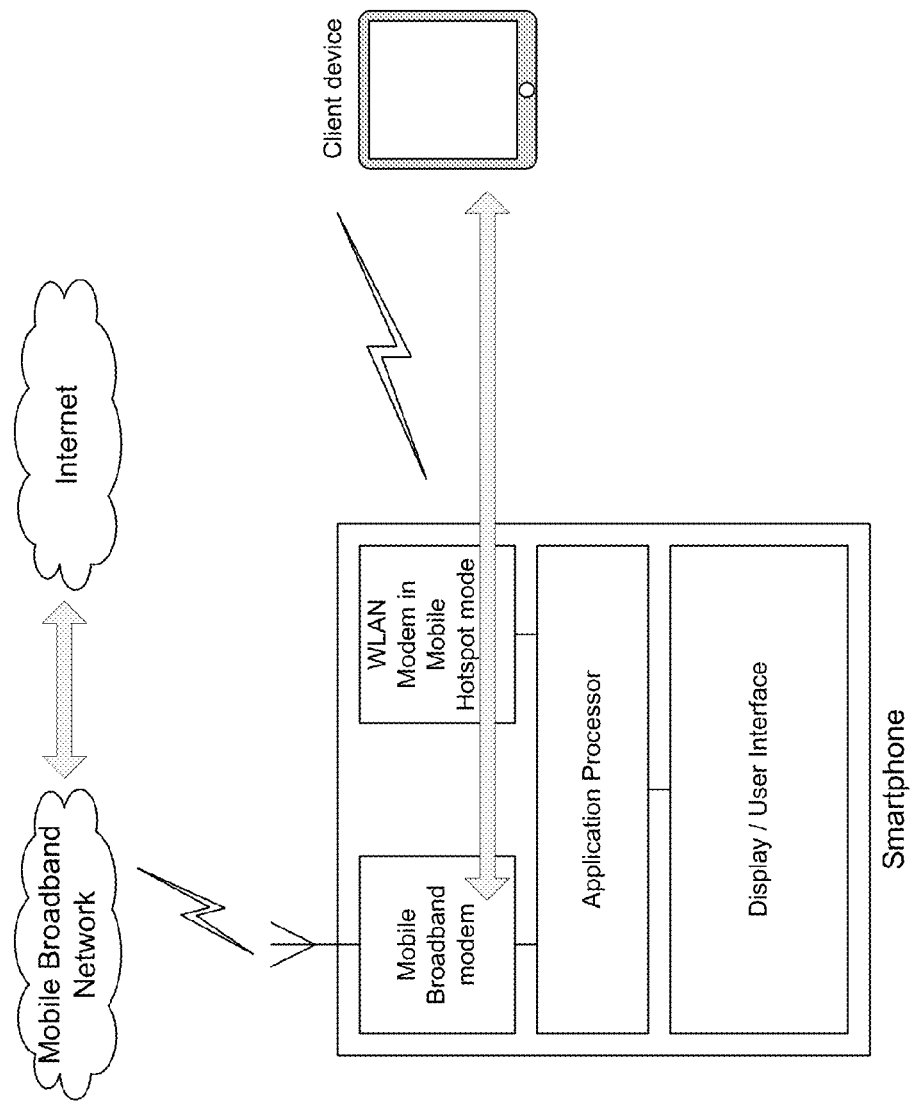
FIG. 6 illustrates a use case of internet access over a WLAN network by a client device through a smartphone operating in mobile Hotspot mode.
Figure 7:
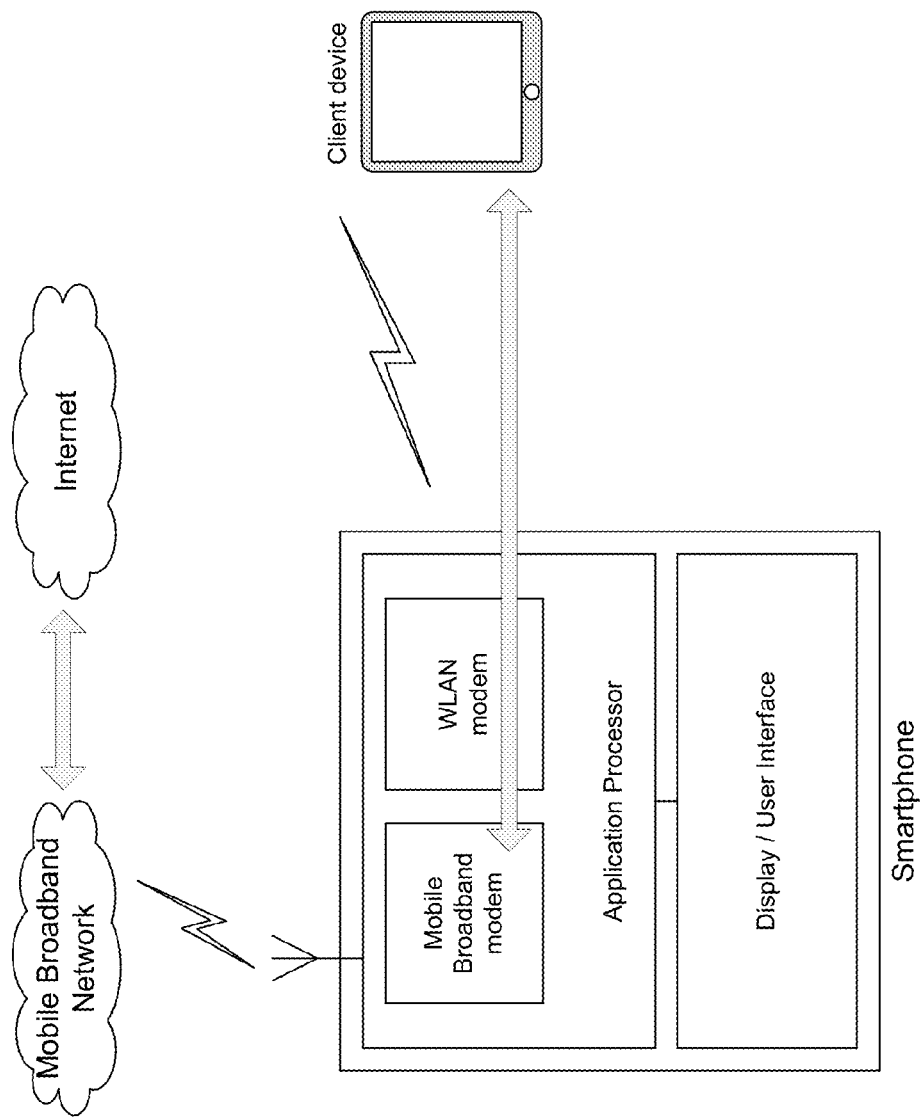
FIG. 7 illustrates a use case of internet access over a WLAN network by a client device through a smartphone operating in mobile Hotspot mode with an integrated mobile broadband modem, WLAN Access Point, and Application Processor.
Figure 8:
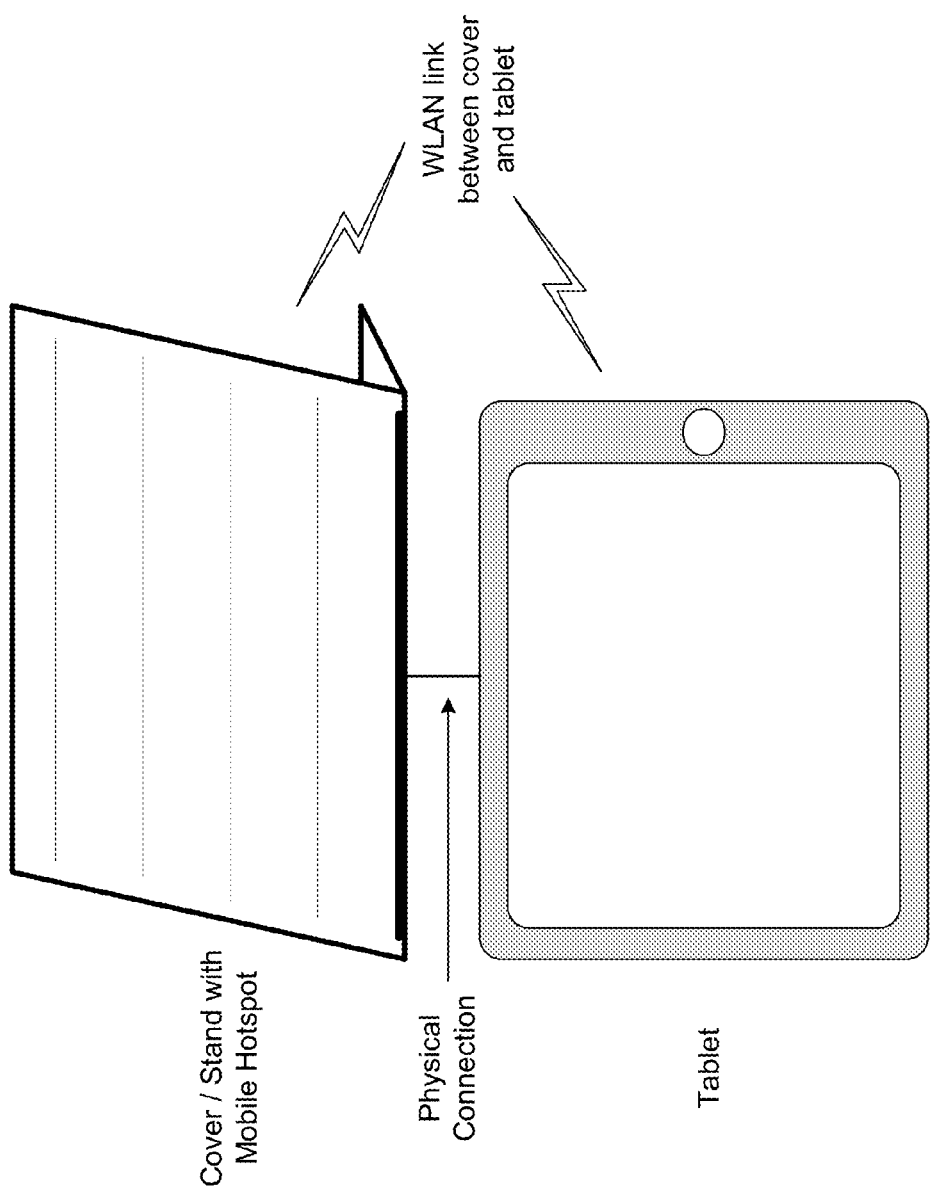
FIG. 8 illustrates a use case of tablet cover with mobile broadband modem offering internet access over a WLAN to a tablet client device and having a physical connection between the tablet and the cover.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of client devices, the disclosure is applicable to any type of client devices some of which are listed in an earlier section in the present disclosure.

The method disclosed in the present disclosure enables the integration of a mobile Hotspot device into a client device running a Windows OS.

Figure 10:
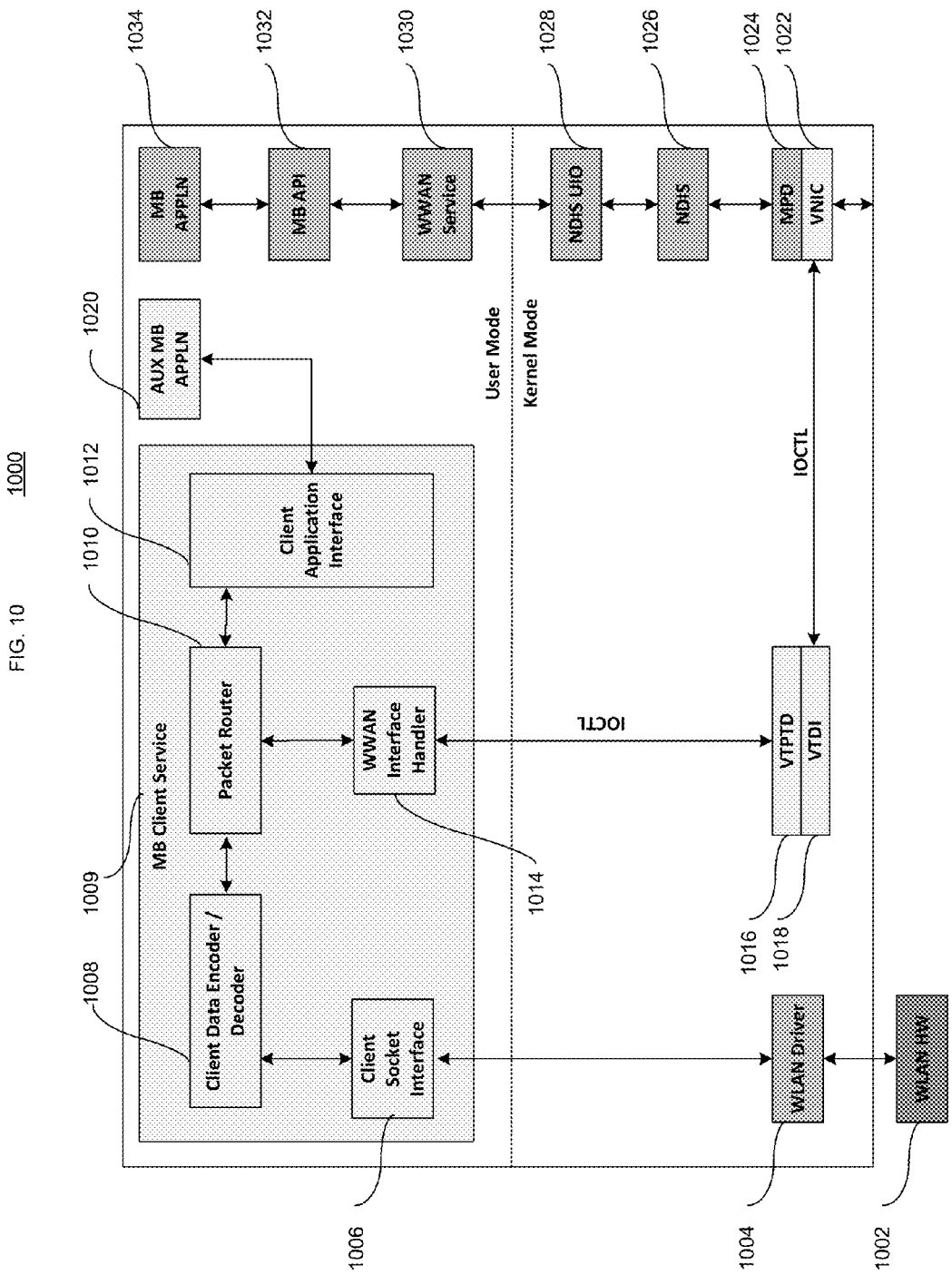
FIG. 10 illustrates software architecture for a virtual MBIM interface through WLAN interface according to the aspects of the present disclosure.

FIG. 10 shows a block diagram 1000 of the software architecture of a client device according to the aspects of the present disclosure for virtually connecting a MB modem over a WLAN. According to the aspects of the present disclosure, a path for routing MBIM control flow related packets from the WLAN Device Driver 1004 to the MB application 1034 and Auxiliary MB application (AUX MB APPLN) 1020 is created although there is no MB device directly connected to the client device. According to the aspects of the present disclosure, a new subsystem referred herein as MB Client Service 1009 is created which comprises the new processing blocks Client Socket Interface 1006, Client Data Encoder/Decoder 1008, Packet Router 1010, the Client Application Interface 1012, and WWAN Interface Handler 1014.

Figure 11:
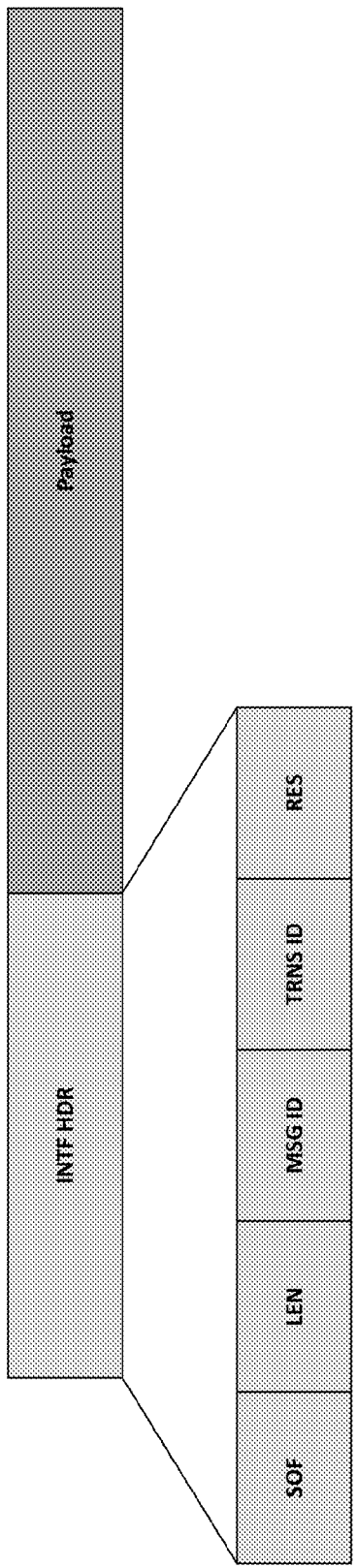
FIG. 11 illustrates the header format for mobile broadband network information transport over different media according to the aspects of the present disclosure.

According to an aspect of the present disclosure, the MBIM control request is encoded with a header format by the Client Data Encoder/Decoder block 1008 as shown in FIG. 11. According to the aspect of the present disclosure, the format comprises an Interface Header part (INTF HDR) and the Payload part. The Interface Header part further comprises a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use. The payload part may be absent or present with a maximum length of 65535 bytes. According to an aspect of the present disclosure, an MBIM or non-MBIM control path packet encoded using the format as described above is referred herein as Virtual Control Path (VCP) packet. A non-MBIM control path packet is referred herein as Auxiliary MBIM packet. The Command IDs (CIDs) associated with the Auxiliary MBIM packets are referred herein as Auxiliary MBIM CIDs.

According to the aspects of the present disclosure, the WLAN Device Driver 1004 interfaces with the Client Socket Interface 1006. The VCP packets to and from the Hotspot device are routed by the WLAN Device Driver 1004 to the Client Socket Interface 1006. The Client Socket Interface 1006 communicates with the Client Data Encoder/Decoder block 1008, which determines whether the VCP packet is for WWAN interface or for other purpose. According to the aspects of the present disclosure, the Packet Router extracts the MB packet embedded inside the VCP packet. If the MBIM Command ID (CID) of the extracted packet is supported by the native MB application 1034, the MBIM packet is routed to the WWAN Interface Handler 1014. If the MBIM CIDs embedded in the VCP packet are not supported by the native MB application 1034, the Auxiliary MBIM packet is routed to the Client Application Interface 1012. The Client Application Interface 1012 in turn communicates with the AUX MB APPLN 1020. The AUX MB APPLN 1020 enables user interface configuration and provides notification of Auxiliary MBIM indications.

According to the aspects of the present disclosure, the new WWAN Interface Handler block 1014 interfaces with the Virtual Target Pass through Driver (VTPTD) block 1016 using the device Input Output Control (IOCTL) protocol. Through the IOCTL interface an application may communicate directly with a device driver. The IOCTL interface is a general-purpose interface that can send control codes to a variety of devices. Each control code represents an operation for the driver to perform. For example, a control code can ask a device driver to return information about the corresponding device, or direct the driver to carry out an action on the device, such as initiating network search. A number of standard control codes are defined in the OS. For example, Communications Control Codes, Device Management Control Codes, Power Management Control Codes, etc. are defined. In addition, device drivers may define their own device-specific control codes. The types of control codes that may be specified depend on the device being accessed and the platform on which the application is running. Applications can use the standard control codes or device-specific control codes to perform device input and output operations.

According to an aspect of the present disclosure, the new block VTPTD 1016 interfaces with the new block Virtual Target Device Interface (VTDI) 1018 which in turn interfaces with a new block Virtual Network Interface Card (VNIC) Device Driver 1022. The VNIC block 1022 provides a NIC type of interface to the mobile broadband device and makes the remote mobile broadband device appear to the MB application 1034 as if it was locally attached to the client device. From this point forward the MB packets from the WLAN Device Driver block 1004 are routed to the MB application 1034 as described earlier. This packet flow enables the MB application to have a virtual MB device connected to it over a WLAN network. The MB application 1034 may be able to query the MB modem in the mobile Hotspot about the WWAN network conditions, USIM/UICC information, and other features as of having a MB modem virtually connected to the client device.

According to an aspect of the present disclosure, when the MB application 1034 sends a MBIM control request to the virtual MB device, the control request is re-directed to WWAN Interface Handler block 1014 using the packet flow path through the blocks 1022, 1018, and 1016. The WWAN Interface Handler block 1014 sends MBIM control request to the Client Data Encoder/Decoder 1008 through the Packet Router 1010. The Client Data Encoder/Decoder block 1008 sends the encoded packet in VCP packet format to the Client Socket Interface block 1006, which in turn sends the VCP packet encapsulating the MBIM packet to the WLAN Device Driver 1004. The MBIM control response from the mobile broadband modem is encoded with the same VCP packet format and sent to the client device over the WLAN interface. The VCP packet format encoded MBIM control response from the mobile broadband modem is decoded by the Client Data Encoder/Decoder block 1008 and the Packet Router block 1010 routes the MBIM control response to WWAN interface handler block 1014. The WWAN interface handler block 1014 sends the MBIM control response to NIC driver through the VTPTD block 1016. The NIC driver eventually sends the MBIM control response to the MB application 1034.

Figure 12:
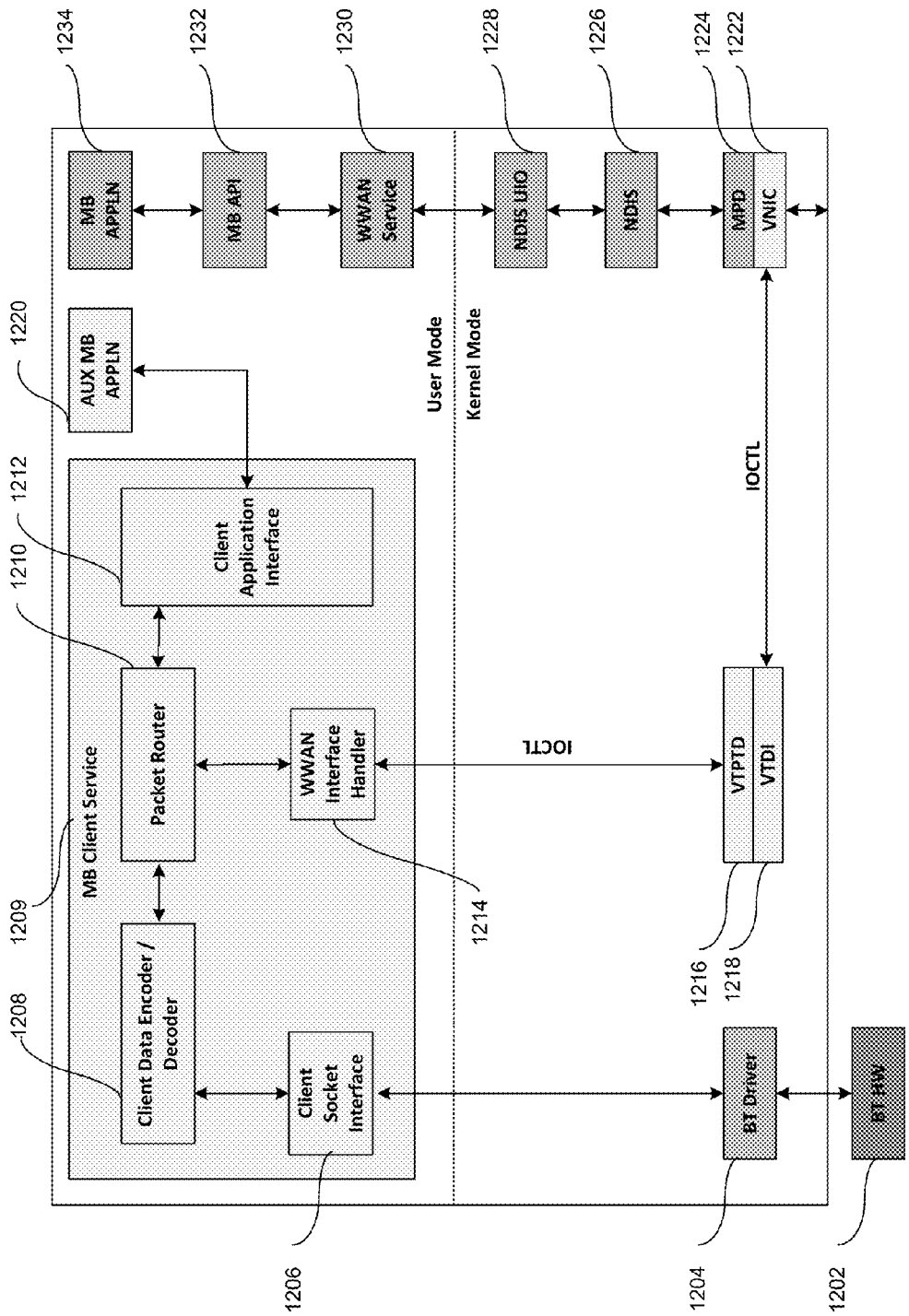
FIG. 12 illustrates software architecture for a virtual MBIM interface through Bluetooth interface according to the aspects of the present disclosure.
Figure 13:
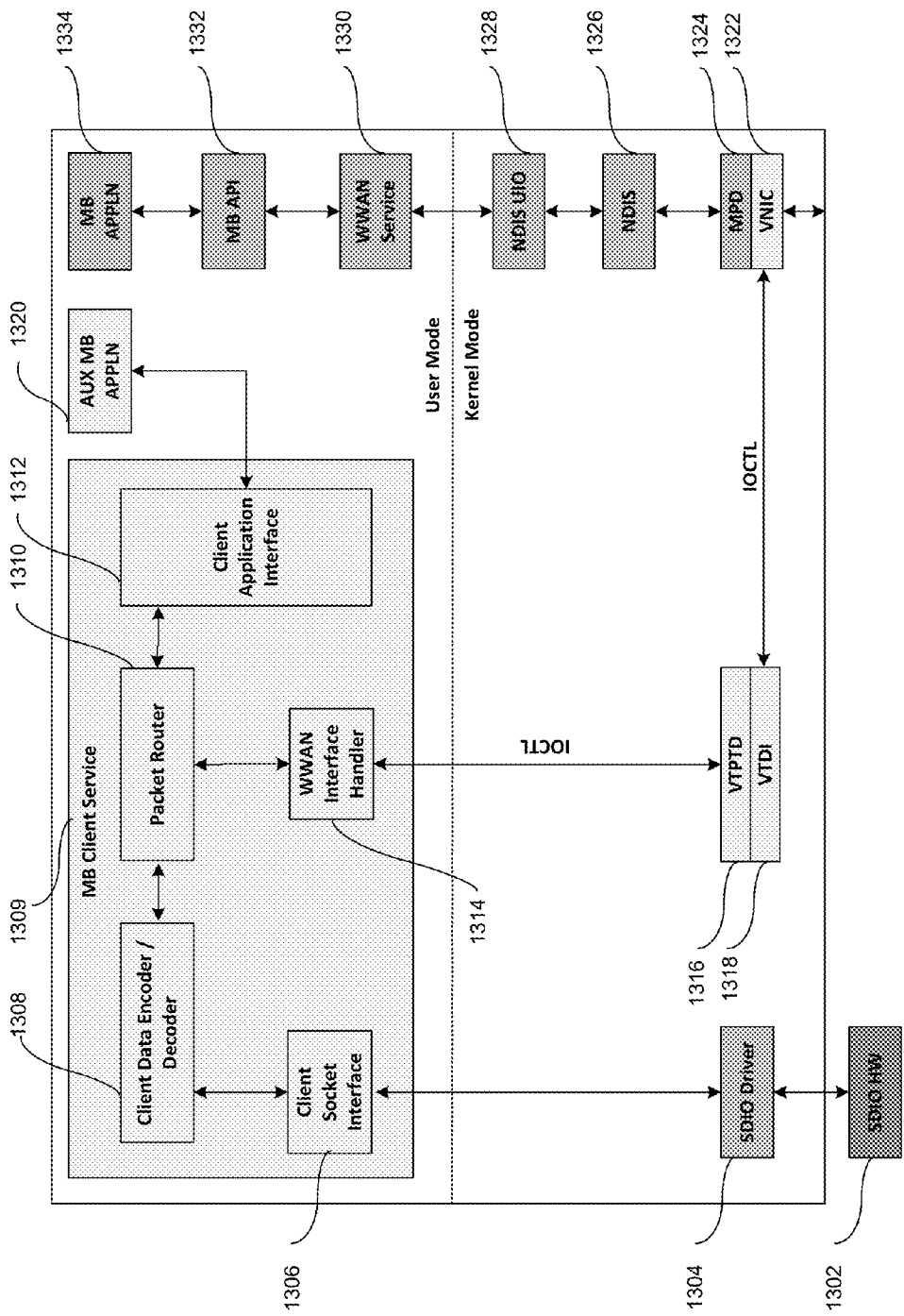
FIG. 13 illustrates software architecture for a virtual MBIM interface through SDIO interface according to the aspects of the present disclosure.
Figure 14:
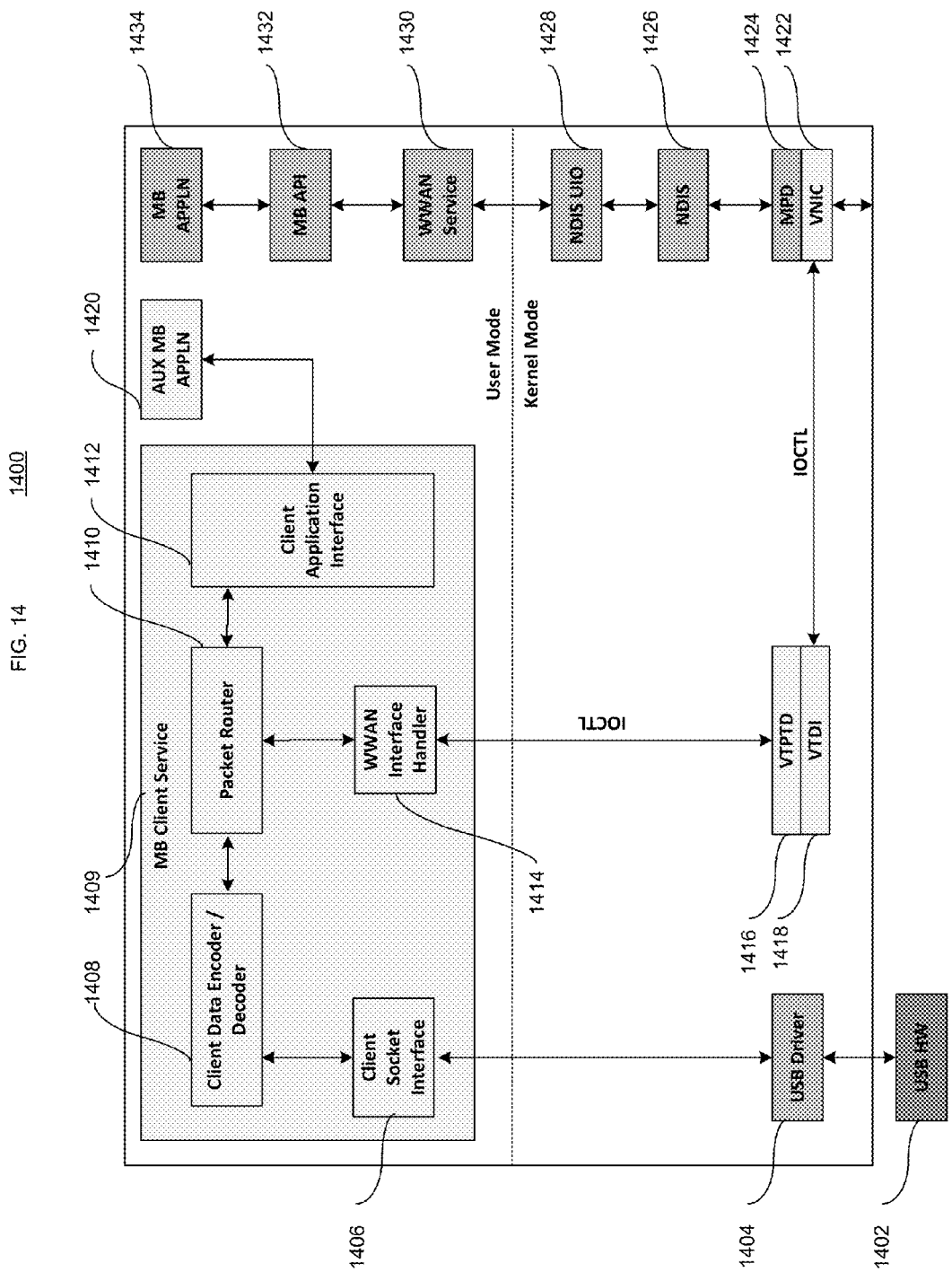
FIG. 14 illustrates software architecture for a virtual MBIM interface through USB interface according to the aspects of the present disclosure.

Although the description of the present disclosure for virtually connecting a MB modem to a client device is described using the WLAN interface as an example, the same function may be implemented using other interfaces. FIG. 12 shows a block diagram 1200 of the software architecture of a client device according to the aspects of the present disclosure for virtually connecting a MB modem over Bluetooth (BT) interface between the hotspot device and the client device. FIG. 13 shows a block diagram 1300 of the software architecture of a client device according to the aspects of the present disclosure for virtually connecting a MB modem over an SDIO interface between the hotspot device and the client device. FIG. 14 shows a block diagram

Figure 15:
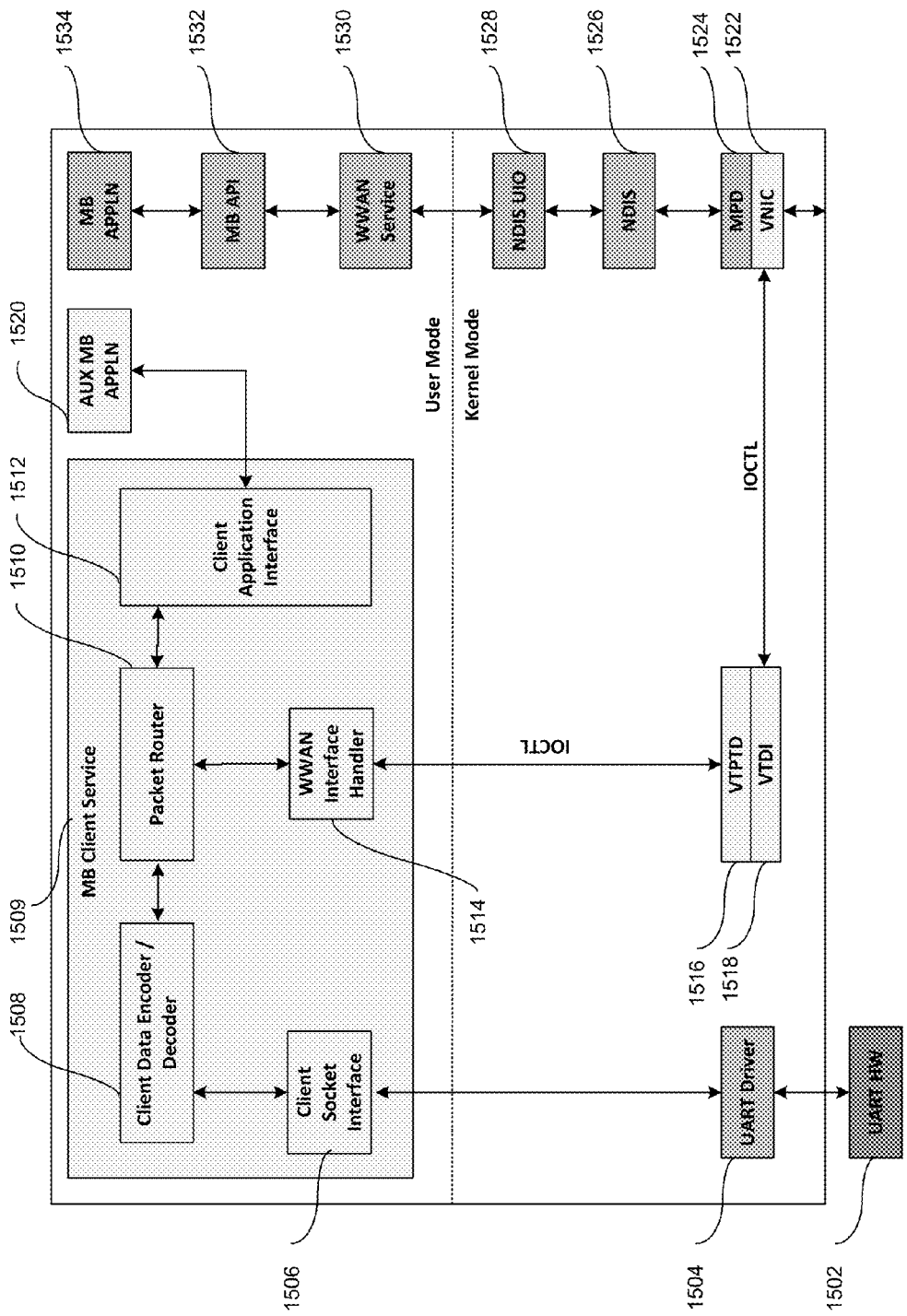
FIG. 15 illustrates software architecture for a virtual MBIM interface through UART interface according to the aspects of the present disclosure.
Figure 16:
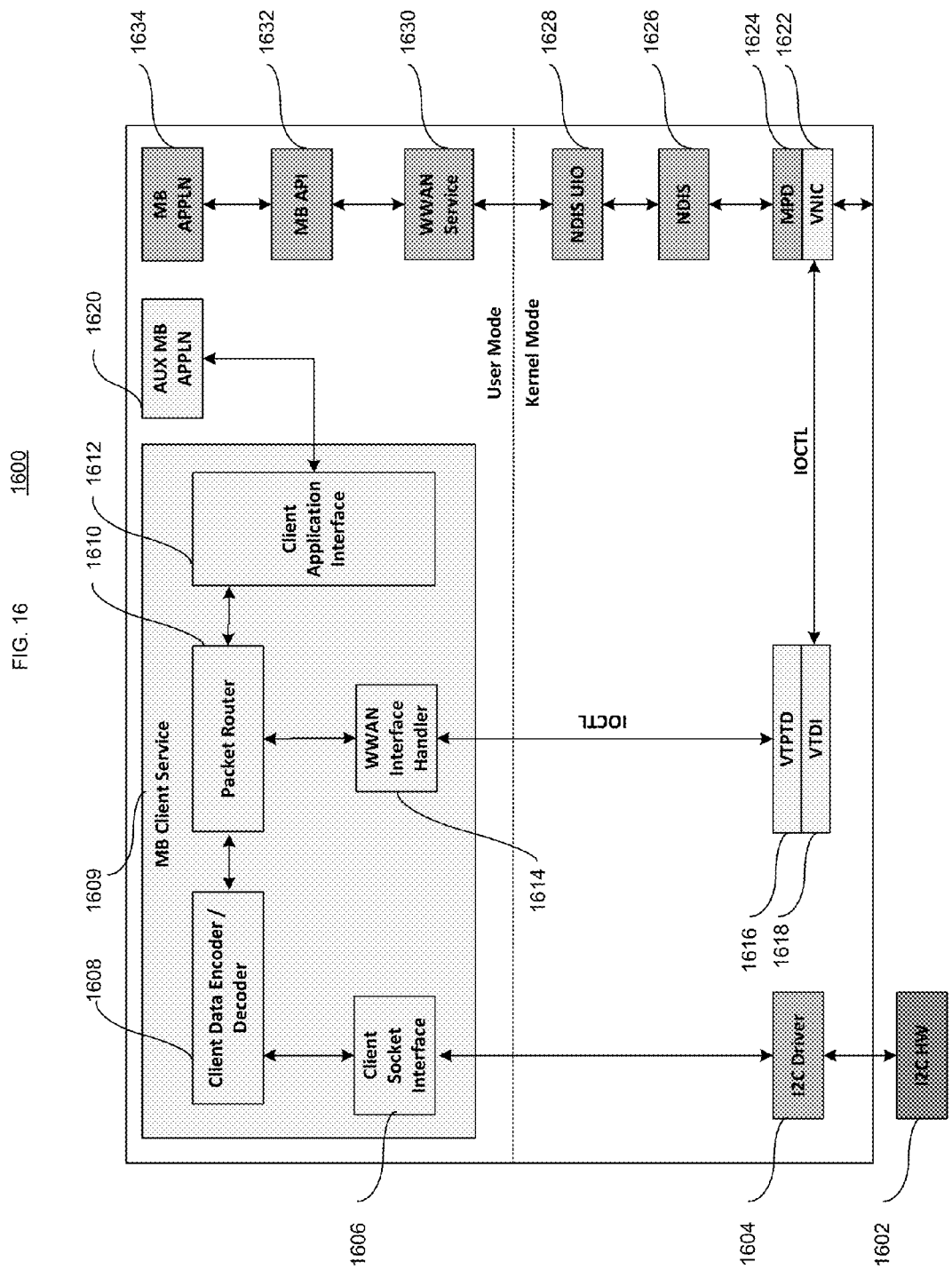
FIG. 16 illustrates software architecture for a virtual MBIM interface through I2C interface according to the aspects of the present disclosure.
Figure 17:
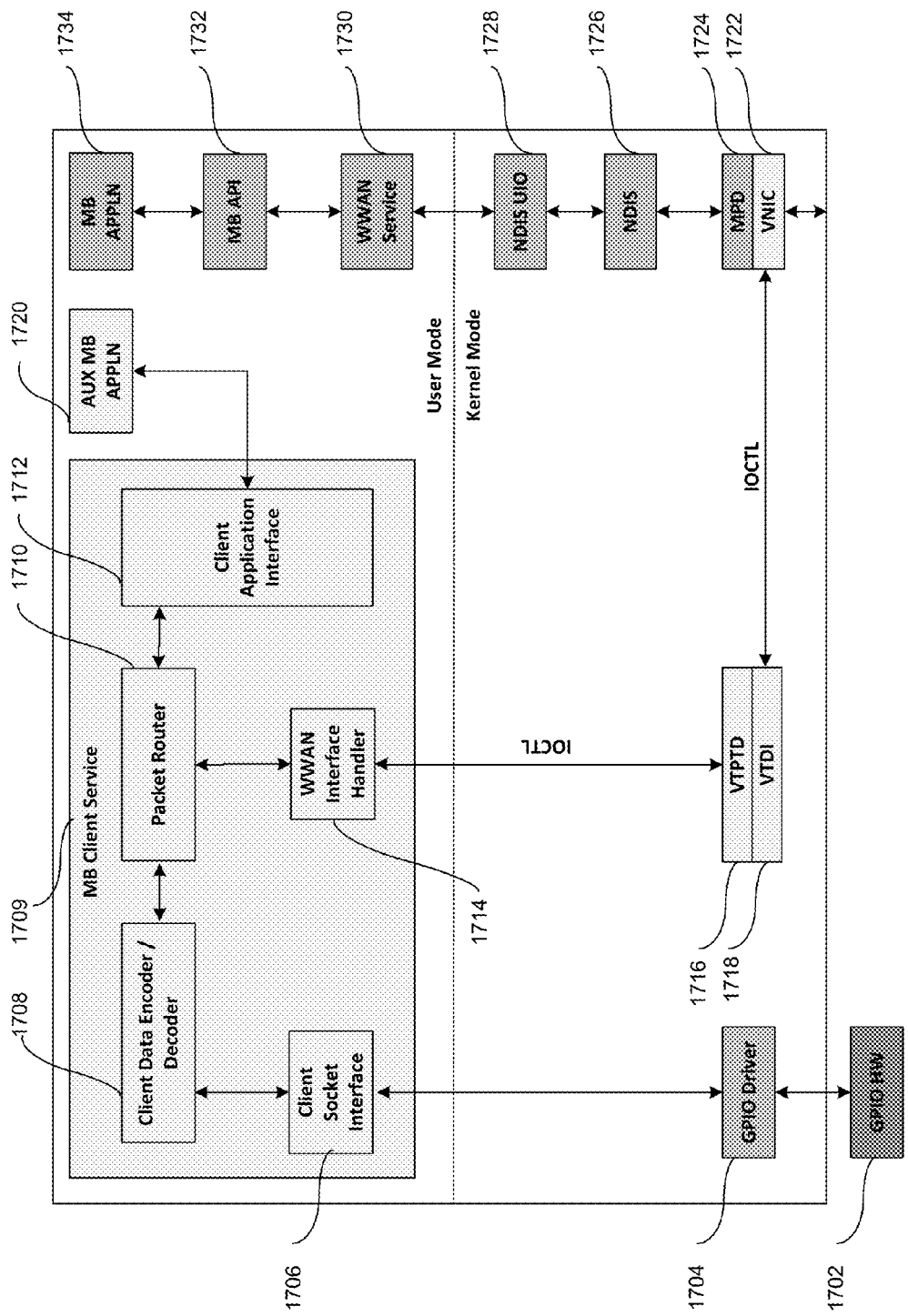
FIG. 17 illustrates software architecture for a virtual MBIM interface through GPIO interface according to the aspects of the present disclosure.

1400 of the software architecture of a client device according to the aspects of the present disclosure for virtually connecting a MB modem over a USB interface between the hotspot device and the client device. Note that although a MB modem with USB interface can directly connect to a client device, there may be devices such as a Customer Premise Equipment (CPE) that may have the MB modem embedded inside them but do not expose the MB modem directly to a client device. In this scenario, the client device may connect to a CPE through USB and then virtually connect to the MB modem inside the CPE according to the aspects of the present disclosure. FIG. 15 shows a block diagram 1500 of the software architecture of a client device according to the aspects of the present disclosure for virtually connecting a MB modem over a UART interface between the hotspot device and the client device. FIG. 16 shows a block diagram 1600 of the software architecture of a client device according to the aspects of the present disclosure for virtually connecting a MB modem over an I2C interface between the hotspot device and the client device. FIG. 17 shows a block diagram 1700 of the software architecture of a client device according to the aspects of the present disclosure for virtually connecting a MB modem over GPIO interface between the hotspot device and the client device. According to the aspects of the present disclosure, MB modem may be virtually connected to a client device over any standard based or proprietary communication interface.

Figure 18:
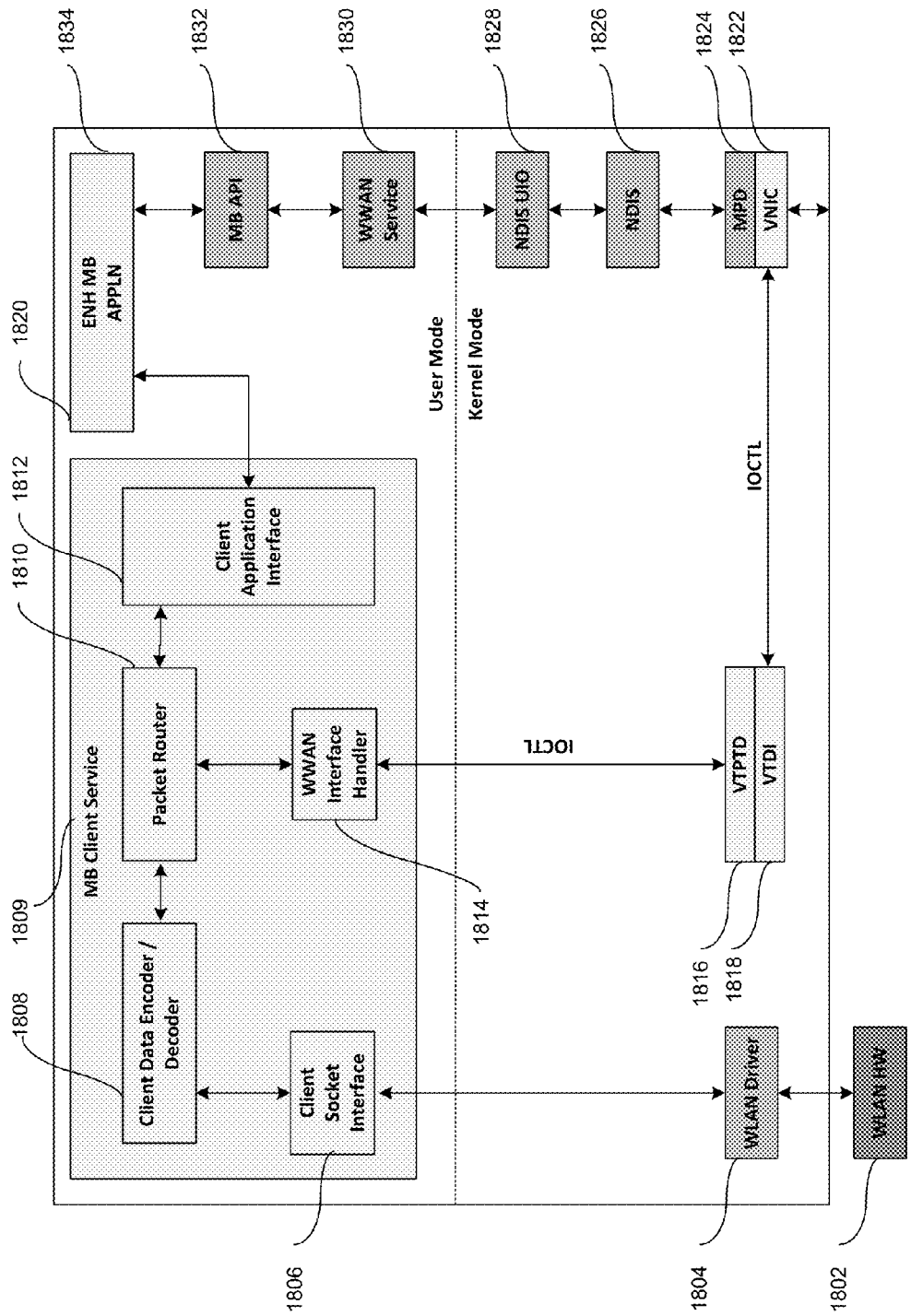
FIG. 18 illustrates software architecture for a virtual MBIM interface through WLAN interface with Enhanced MB Application and two interfaces according to the aspects of the present disclosure.
Figure 19:
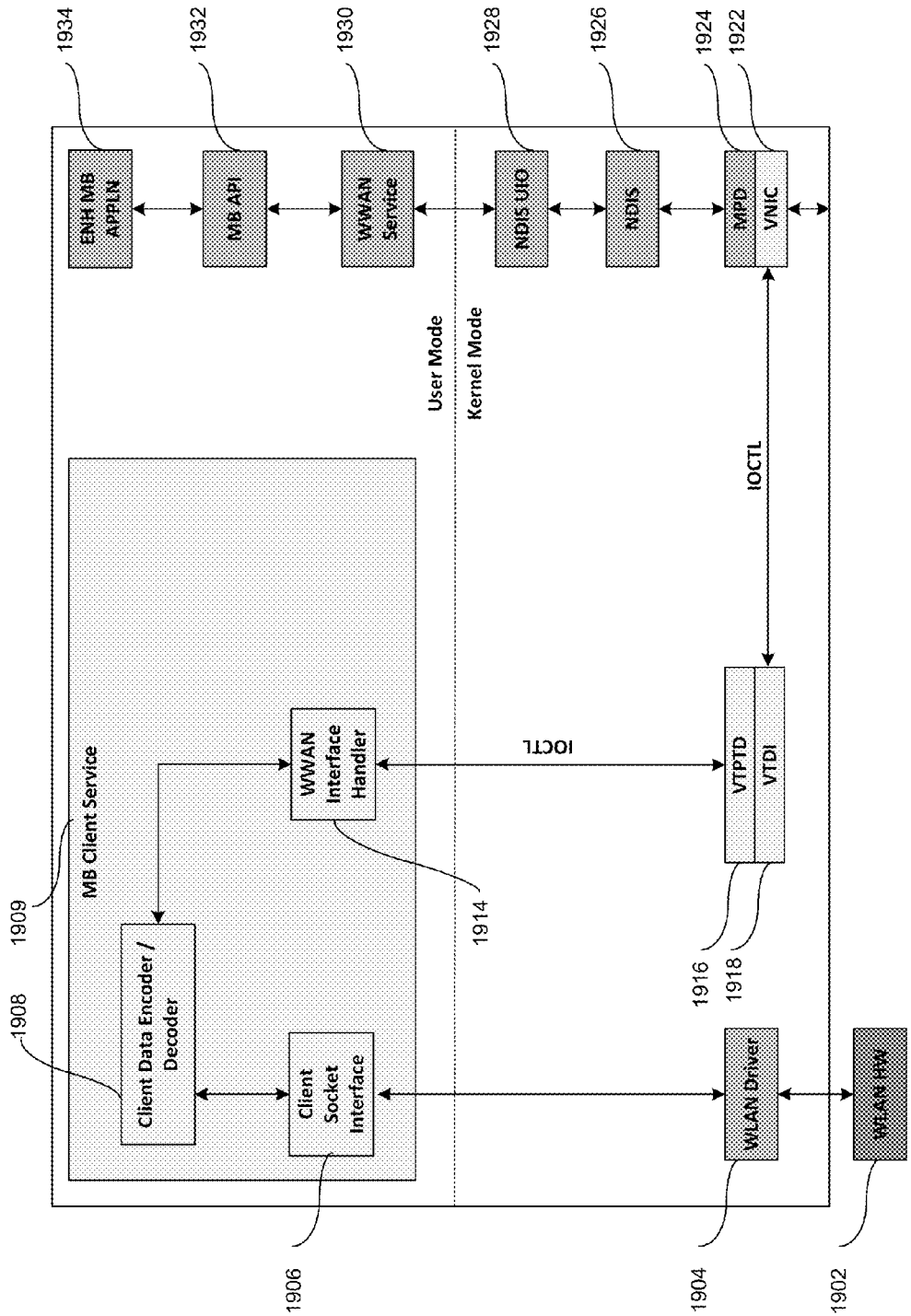
FIG. 19 illustrates software architecture for a virtual MBIM interface through WLAN interface with Enhanced MB Application and single common interface according to the aspects of the present disclosure.

According to another aspect of the present disclosure, the AUX MB APPLN 1020 and the baseline MB APPLN 1034 in FIG. 10 may be integrated into a new Enhanced MB Application (ENH MB APPLN) 1834 as shown in FIG. 18. According to another aspect of the disclosure, the processing block Packet Router 1810 and the processing block Client Application Interface 1812 may be removed and the Client Data Encoder/Decoder block 1808 may directly interface with WWAN Interface Handler 1814. This aspect of the disclosure is illustrated in FIG. 19. The ENH MB APPLN 1934 may now communicate all the MBIM and Auxiliary MBIM CIDs through a single common interface with the MB API 1932. According to the aspects of the present disclosure, the baseline MBIM CIDs and the Auxiliary MBIM CID may be collectively referred as Enhanced MBIM CIDs.

Figure 9:
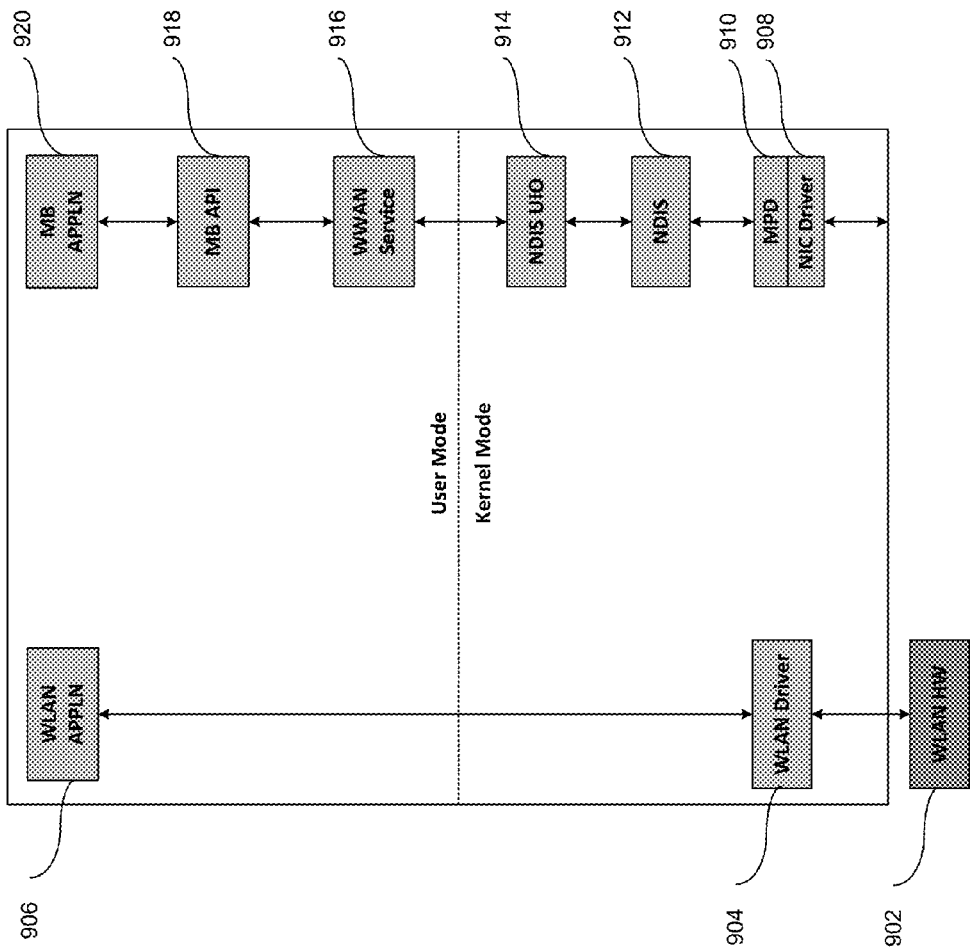
FIG. 9 illustrates conventional software architecture for a WLAN and Ethernet connection in a client device.

The mobile Hotspot may be initially configured using the client device. A client device may provide the required software drivers and updates to enable the mobile Hotspot to process the new MBIM CIDs and other new message formats. The initial configuration of the mobile Hotspot may be done using the conventional method of communication between the mobile Hotspot and the client device as shown in FIG. 9. After the mobile Hotspot is configured, the client device may start using the new MBIM CIDs to virtually connect the mobile Hotspot to the client device over WLAN interface.

The invention claimed is:

1. A method for projecting a device configured for mobile broadband (MB) access and local internet distribution as a virtual MB modem for control path, wherein the projecting of the device as the virtual MB modem is through a first interface of a client device, the method comprising:

controlling, by a processing device, creating a path for routing a MB Interface Model (MBIM) control flow related packet between a first device driver of the first interface of the client device and a MB application of the client device, in which the path includes a second device driver of a second interface of the client device for communicatively coupling the first device driver to the MB application, wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler;

controlling, by the processing device, encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and controlling, by the processing device, when a MBIM control path packet is determined to be encoded as the VCP packet, routing the MBIM control path packet encoded from the Encoder/Decoder to the WWAN Interface Handler, wherein the WWAN interface handler is for communicating with a Virtual Target Pass through Driver (VTPTD) using a device Input Output Control (IOCTL) protocol, wherein a Virtual Target Device Interface (VTDI) is for communicating with the VTPTD and a Virtual Network Interface Card (VNIC) Device Driver, in which the VNIC device driver is included in the second device driver, and wherein the path includes the VTPTD, the VTDI and the VNIC Device Driver.

2. The method of claim 1, further comprising:

controlling, by the processing device, when the MBIM control path packet is determined to be encoded as the VCP packet, routing the MBIM control path packet encoded from the WWAN Interface Handler, through the VTPTD, the VTDI and the VNIC Device Driver, to the MB application.

3. The method of claim 1, further comprising:

controlling, by the processing device, determining by the Client Data Encoder/Decoder whether the MBIM control path packet or a non-MBIM control path packet is encoded as the VCP packet, when the MBIM control path packet is determined to be is encoded as the VCP packet, routing the MBIM control path packet to the MB application, and when the non-MBIM control path packet is determined to be is encoded as the VCP packet, routing the non-MBIM control path packet to an Auxiliary MB Application.

4. The method of claim 3, wherein the MB Application and the Auxiliary MB Application are integrated into an enhanced MB Application.

5. The method of claim 4, further comprising:

controlling, by the processing device, routing the MBIM or non-MBIM control path packet from the WWAN Interface Handler, through the VTPTD, the VTDI and the VNIC Device Driver, to the enhanced MB application.

6. The method of claim 1, wherein the MB Service includes a Packet Router for communicating with the Encoder/Decoder, the WWAN interface handler and a Client Application Interface, wherein the Client Application Interface is for communicating with an Auxiliary MB application, and wherein the path includes the Packet Router, and the method further comprising:
controlling, by the processing device,
extracting by the packet router from an MB packet from the VCP packet,
when an MBIM Command ID (CID) of the extracted MB packet is determined to be supported by a native MB application, routing of the MB packet to the WWAN Interface Handler, and
when the MBIM Command ID (CID) of the extracted MB packet is determined not to be supported by the native MB application, routing of the MB packet to the Auxiliary MB application via the Client Application Interface,
in which the AUX MB application is configured to enable user interface configuration and provide notification of an Auxiliary MBIM indication.

7. The method of claim 1,
wherein the MB Service includes a Packet Router for communicating with the Encoder/Decoder and the WWAN interface handler, and
the method further comprising:
controlling, by the processing device,
when the MB application sends a second MBIM control request, routing the second MBIM control request to the WWAN interface handler through the VNIC device driver, the VTDI and the VTPTD, and from the WWAN interface handler through the Packet Router to the Encoder/Decoder,
encoding by the Encoder/Decoder the second MBIM control request as a second VCP packet, and
routing of the second VCP packet through the Client Socket Interface to the first device driver.

8. The method of claim 1, further comprising:
controlling, by the processing device, when the MBIM control path packet is determined to be encoded as the VCP packet, routing the MBIM control path packet encoded from the Encoder/Decoder directly, without an intermediary, to the WWAN Interface Handler.

9. The method of claim 1, wherein the first interface is a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

10. The method of claim 1,
wherein the first interface is a Universal Serial Bus (USB) interface, and
wherein the first interface is communicatively coupled to the MB service through a Customer Premises Equipment within the client device.

11. The method of claim 1,
wherein the Interface Header part includes a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use, and
wherein the payload has a maximum length of 65535 bytes.

12. An apparatus for projecting a device configured for mobile broadband (MB) access and local internet distribution as a virtual MB modem for control path, wherein the projecting of the device as the virtual MB modem is through a first interface of a client device, the apparatus comprising:
circuitry configured to control:
creating a path for routing a MB Interface Model (MBIM) control flow related packet between a first device driver of the first interface of the client device and a MB application of the client device, in which the path includes a second device driver of a second interface of the client device for communicatively coupling the first device driver to the MB application,
wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler;
encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and
when a MBIM control path packet is determined to be encoded as the VCP packet, routing the MBIM control path packet encoded from the Encoder/Decoder to the WWAN Interface Handler,
wherein the WWAN interface handler is for communicating with a Virtual Target Pass through Driver (VTPTD) using a device Input Output Control (IOCTL) protocol,
wherein a Virtual Target Device Interface (VTDI) is for communicating with the VTPTD and a Virtual Network Interface Card (VNIC) Device Driver, in which the VNIC device driver is included in the second device driver, and
wherein the path includes the VTPTD, the VTDI and the VNIC Device Driver.

13. The apparatus of claim 12,
wherein the circuitry is configured to control, when the MBIM control path packet is determined to be encoded as the VCP packet, routing the MBIM control path packet encoded from the WWAN Interface Handler, through the VTPTD, the VTDI and the VNIC Device Driver, to the MB application.

14. The apparatus of claim 12,
wherein the circuitry is configured to control:
determining by the Client Data Encoder/Decoder whether the MBIM control path packet or a non-MBIM control path packet is encoded as the VCP packet,
when the MBIM control path packet is determined to be is encoded as the VCP packet, routing the MBIM control path packet to the MB application, and
when the non-MBIM control path packet is determined to be is encoded as the VCP packet, routing the non-MBIM control path packet to an Auxiliary MB Application.

15. The apparatus of claim 14,
wherein the MB Application and the Auxiliary MB Application are integrated into an enhanced MB Application.

16. The apparatus of claim 12,
wherein the MB Service includes a Packet Router for communicating with the Encoder/Decoder, the WWAN interface handler and a Client Application Interface, wherein the Client Application Interface is for communicating with an Auxiliary MB application, and wherein the path includes the Packet Router, and
wherein the circuitry is configured to control:
extracting by the packet router from an MB packet from the VCP packet, when an MBIM Command ID (CID) of the extracted MB packet is determined to be supported by a native MB application, routing of the MB packet to the WWAN Interface Handler, and when the MBIM Command ID (CID) of the extracted MB packet is determined not to be supported by the native MB application, routing of the MB packet to the Auxiliary MB application via the Client Application Interface, in which the AUX MB application is configured to enable user interface configuration and provide notification of an Auxiliary MBIM indication.

17. The apparatus of claim 12, wherein the MB Service includes a Packet Router for communicating with the Encoder/Decoder and the WWAN interface handler, and wherein the circuitry is configured to control:

when the MB application sends a second MBIM control request, routing the second MBIM control request to the WWAN interface handler through the VNIC device driver, the VTDI and the VTPTD, and from the WWAN interface handler through the Packet Router to the Encoder/Decoder, encoding by the Encoder/Decoder the second MBIM control request as a second VCP packet, and routing of the second VCP packet through the Client Socket Interface to the first device driver.

18. The apparatus of claim 12, further comprising:

wherein the circuitry is configured to control, when the MBIM control path packet is determined to be encoded as the VCP packet, routing the MBIM control path packet encoded from the Encoder/Decoder directly, without an intermediary, to the WWAN Interface Handler.

19. A wireless communication device comprising:

a receiver to receive a wireless communication; and a processing device configured for projecting a device configured for mobile broadband (MB) access and local internet distribution as a virtual MB modem for control path, wherein the projecting of the device as the virtual MB modem is through a first interface of the wireless communication device, wherein the processing device is configured to control:

creating a path for routing a MB Interface Model (MBIM) control flow related packet between a first device driver of the first interface of the wireless communication device and a MB application of the wireless communication device, in which the path includes a second device driver of a second interface of the wireless communication device for communicatively coupling the first device driver to the MB application, wherein the path includes a MB Service, the MB Service including a Client Socket Interface for communicating with the first device driver, and a Client Data Encoder/Decoder for communicating with the Client Socket Interface and a Wireless Wide Area Network (WWAN) Interface Handler;

encoding by the Client Data Encoder/Decoder, as a virtual control path (VCP) packet, a MBIM control request routed from the first device driver to the MB Service through the Client Socket Interface, wherein the VCP packet includes an Interface Header (INTF HDR) part and an optional Payload part; and when a MBIM control path packet is determined to be encoded as the VCP packet, routing the MBIM control path packet encoded from the Encoder/Decoder to the WWAN Interface Handler, wherein the WWAN interface handler is for communicating with a Virtual Target Pass through Driver (VTPTD) using a device Input Output Control (IOCTL) protocol, wherein a Virtual Target Device Interface (VTDI) is for communicating with the VTPTD and a Virtual Network Interface Card (VNIC) Device Driver, in which the VNIC device driver is included in the second device driver, and wherein the path includes the VTPTD, the VTDI and the VNIC Device Driver.

20. The wireless communication device of claim 19, wherein the processing device is configured to control:

determining by the Client Data Encoder/Decoder whether the MBIM control path packet or a non-MBIM control path packet is encoded as the VCP packet, when the MBIM control path packet is determined to be is encoded as the VCP packet, routing the MBIM control path packet to the MB application, and when the non-MBIM control path packet is determined to be is encoded as the VCP packet, routing the non-MBIM control path packet to an Auxiliary MB Application.

\* \* \* \* \*